(No Model.)

C. W. LANPHER.
CAR WHEEL AND AXLE.

No. 304,011. Patented Aug. 26, 1884.

Witnesses.
A. Ruppert.
Alfred Gage

Chas. W. Lanpher.
Inventor
by
England and Blanchard
Atty's.

(No Model.) 2 Sheets—Sheet 2.
C. W. LANPHER.
CAR WHEEL AND AXLE.
No. 304,011. Patented Aug. 26, 1884.
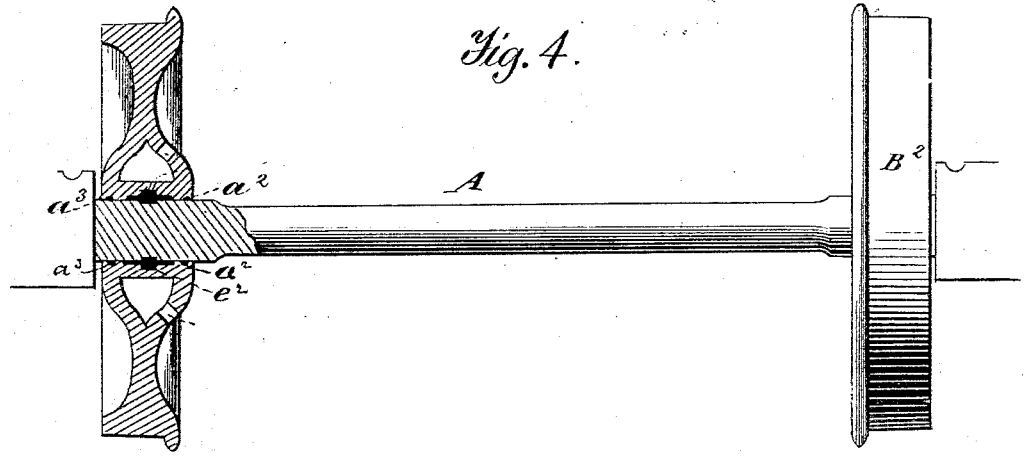
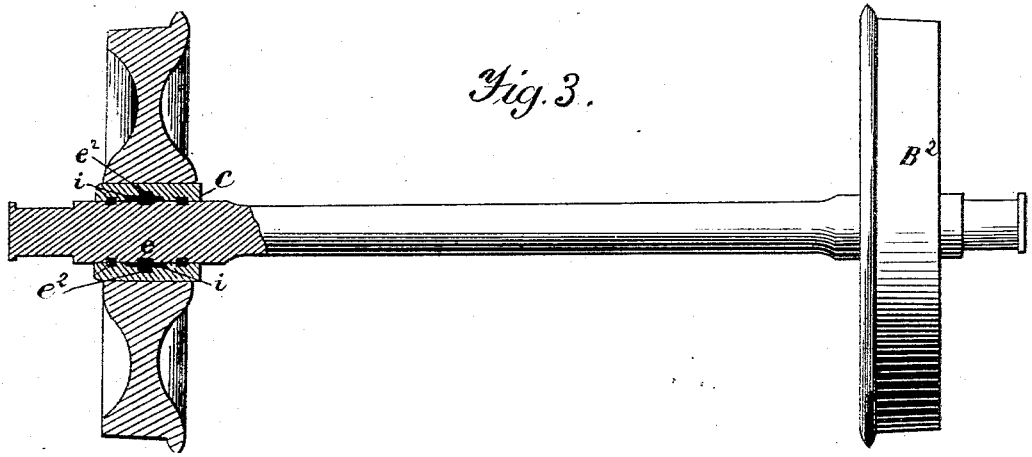
Witnesses.
A. Ruppert.
Alfred Gage.
Chas. W. Lanpher.
Inventor.
by England & Blanchard
Attys.

UNITED STATES PATENT OFFICE.

CHARLES W. LANPHER, OF NORWICH, NEW YORK.

CAR WHEEL AND AXLE.

SPECIFICATION forming part of Letters Patent No. 304,011, dated August 26, 1884.

Application filed October 18, 1883. (No model.)

*To all whom it may concern:*

Be it known that I, CHARLES W. LANPHER, a citizen of the United States, residing at Norwich, in the county of Chenango and State of New York, have invented certain new and useful Improvements in Journal-Boxes, Car-Axles, and Car-Wheels, of which the following is a specification, reference being had therein to the accompanying drawings.

This invention relates to car-wheels and axles; and it consists in certain improvements in the construction of the same, as herein described and claimed, the invention having reference to the construction and attachment of wheels and axles with the view to prevent lateral movement of the wheel on the axle, and also to avoid friction or binding of parts when the cars are rounding a curve in the road.

Figure 2:
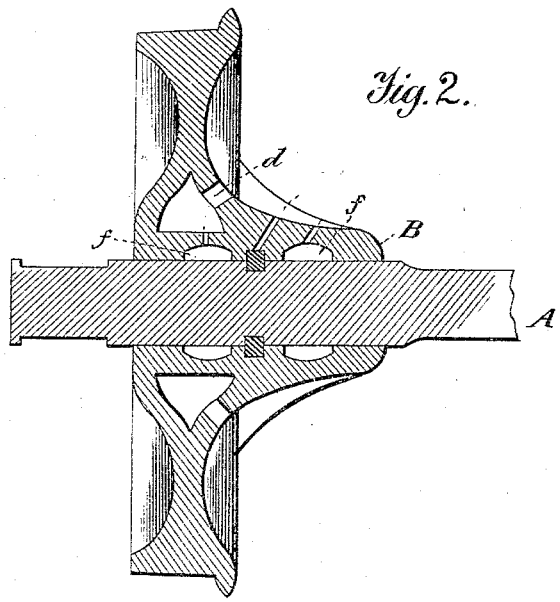
Figure 1:
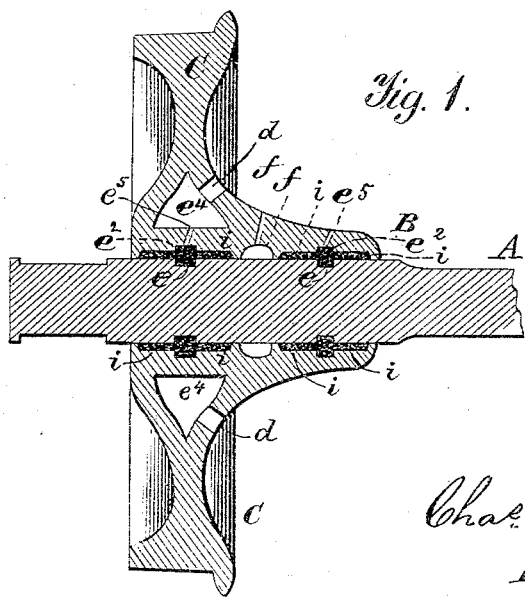

In the accompanying drawings, Figure 1 represents a central vertical section of a car wheel and axle having my improvements. Fig. 2 is a central section showing elongated hub with annular grooves for lubricating-matter. Fig. 3 shows in section a car wheel and axle with hub of wheel formed of a sleeve provided with my improvement. Fig. 4 shows in section a modification in construction of wheel.

The wheel C, (seen in Fig. 1,) is a loose wheel intended to turn freely on the axle A, the wheel at the other end of the axle being fastened tightly thereto. The said wheel is constructed with an elongated hub, such elongation, B, extending inward to strengthen the wheel and form a greater bearing-surface for it on the axle. One or more annular recesses, $e$, are formed in the axle A, and one or more annular recesses, $e^2$, are formed in the inner surface of the hub of the wheel, and when the latter is in position on the axle the recesses $e$ are in line with the recesses $e^2$. The central portions of the annular recesses $e^2$ in the hub correspond in size and depth with the recesses $e$ in the axle; but, as will be seen, the recesses $e^2$ have lateral extensions, $i$, of a less depth than the central portions. The wheel C is hollow, or has an annular chamber, $e^4$, with outward openings, $d$, and an inlet-aperture, $e^3$, leading to the annular recess $e^2$, through which melted metal—that being preferred which is least liable to shrink when cooled—may be poured to fill the annular chamber formed between the axle and hub by the recesses $e$ and $e^2$ and extensions $i$. The metal thus filling the recesses, as shown, forms bearing-surfaces, both vertical and horizontal, between the wheel and axle, and is adapted to retain the wheel in place and allow it to revolve freely on the axle; also to prevent tilting or binding, or any irregular movement of the wheel when a train is passing over a curve in the road. Another annular recess, $f$, is made in the hub of the wheel, which is provided with an inlet-opening, $f'$, for the purpose of lubricating the axle.

In Fig. 3 the wheel is shown with its hub formed of a sleeve, $c$, provided with annular recess $e^2$, with extensions $i$, the recess $e$ being formed in the axle, as shown. The inner surface of the hub of the wheel, near its extremities, is provided with small annular grooves, as seen at $a^2$ and $a^3$ in Fig. 4, to receive packing to prevent dust and dirt from working in between the hub and the axle.

Having described my invention, I claim—

1. A car-wheel having a hub which is provided with one or more internal annular recesses, $e^2$, having lateral extensions $i$ and inlet-apertures, in combination with the axle, provided with one or more annular recesses, $e$, and the metal filling the recesses $e$ and $e^2$, constructed and arranged substantially as and for the purposes described.

2. A car-wheel the hub of which is provided with one or more annular recesses, $e^2$, having extensions $i$ and one or more annular recesses, $f$, with inlets $f'$ for lubricating purposes, in combination with the axle having annular recess $e$, and the metal filling of said recesses $e$ and $e^2$, substantially as and for the purposes set forth.

3. A car-wheel having its hub formed of a sleeve, $c$, provided with one or more annular recesses, $e^2$, having extensions $i$, in combination with the axle having one or more annular recesses, $e$, and the metal filling the recesses $e$ and $e^2$, substantially as and for the purpose set forth.

In testimony whereof I affix my signature in presence of two witnesses.

CHARLES W. LANPHER.

Witnesses:
WM. J. McCAW,
DWIGHT B. TAYLOR.